United States Patent

[11] 3,599,842

[72] Inventor Samuel B. Boster
 7304 Reading Road, Cincinnati, Ohio 45237
[21] Appl. No. 768,031
[22] Filed Oct. 16, 1968
[45] Patented Aug. 17, 1971

[54] MEASURING DISPENSER WITH AGITATOR FOR COMMINUTED MATERIAL
 4 Claims, 5 Drawing Figs.
[52] U.S. Cl. ................................................. 222/245
[51] Int. Cl. .......................................... G01f 11/14
[50] Field of Search .................................... 222/234,
 235, 230, 231, 245, 243, 361, 362

[56] References Cited
UNITED STATES PATENTS
2,729,366 3/1956 Chadwick .................. 222/362
3,347,425 10/1967 Beushausen et al. ......... 222/361
531,599 12/1894 Ross et al. .................. 222/245
1,320,250 10/1919 Llewellyn .................... 222/245
1,846,775 2/1932 Wegmann et al. ............ 222/245
FOREIGN PATENTS
26,126 11/1910 Great Britain ............... 222/245

Primary Examiner—Harvey C. Hornsby
Assistant Examiner—Hadd S. Lane
Attorney—Walter S. Murray ABSTRACT: This disclosure describes a dispenser for comminuted material, such as "instant" coffee contained in a jar, the dispenser including a reciprocated slide having a measuring dispenser opening that is movable between a jar discharge opening and a dispensing opening, and an agitator pivotally mounted above the jar discharge opening and having a drive connection with the reciprocated slide to preclude buildup of comminuted material around said discharge opening and insure the delivery of an accurate amount of material to the measuring dispenser opening of the slide.

PATENTED AUG 17 1971 3,599,842

INVENTOR
Samuel B. Boster
BY *(signature)*
ATTY.

3,599,842

MEASURING DISPENSER WITH AGITATOR FOR COMMINUTED MATERIAL

This invention relates to a dispenser for comminuted material and is particularly directed to a cap-type dispenser for "instant" coffee granules contained in a jar or bottle and to a novel material agitator device associated with the dispenser.

Heretofore jar cap dispensers have been used to deliver measured quantities of a comminuted material such as "instant" coffee granules, or the like, from jar containers to cups, or other utensils, but these cap dispensers often clogged around the cap discharge openings due to a buildup of the material around the inside portion of the openings. This buildup resulted in the dispensing of charges less than the predetermined measured amounts or a complete failure to dispense charges which made them untrustworthy and therefore undesirable as measuring dispensers.

It is therefore an object of the invention to provide a coffee jar cap dispenser capable of delivering an accurate measured amount of "instant" coffee from a jar container into a cup with each actuation of the dispenser.

Another object of the invention is to provide a cap-mounted agitator device for a coffee jar that is actuated by the dispenser in a simplified, yet positive manner.

A further object of the invention is to provide a three-part jar cap dispenser having the foregoing characteristics which may be manually taken apart for cleaning purposes and readily assembled without the use of tools.

Further objects of the invention will be apparent from the following specification, taken in conjunction with the accompanying drawings, wherein:

FIG. 1 is a perspective view of the dispenser associated with a jar containing comminuted material and in position dispensing a measured quantity of said material into a cup, or the like.

Figure 1:
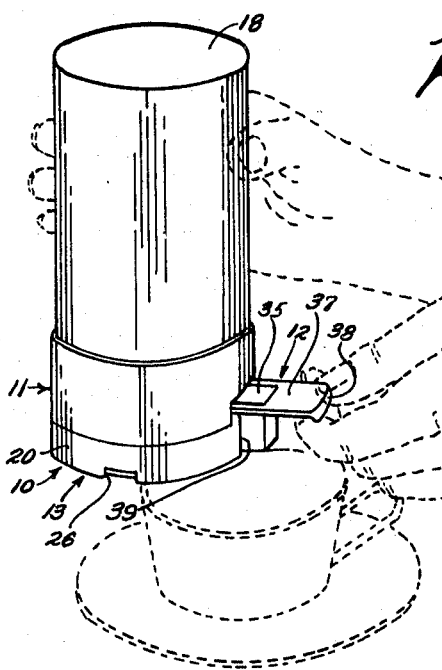

With particular reference to the accompanying drawings, the numeral 10 indicates my composite measuring dispenser comprising a jar engaging upper member 11, a dispensing slide 12 and a slide mounting lower member 13, all preferrably molded from a plastic material such as polypropylene. The upper member 11 is circular in form and is provided with a flat material supporting wall 14 and an upstanding collar 15 which is internally threaded by partial thread portions 16 for engagement with the externally threaded, open mouth 17 of a glass jar 18 containing comminuted material such as "instant" coffee granules, or the like, As clearly shown in FIG. 3 of the drawings, a tight connection is made between the jar mouth 17 and the upper member 11 when an internal shoulder 170 on the upper member is tightened against the rim of the mouth 17.

Figure 3:
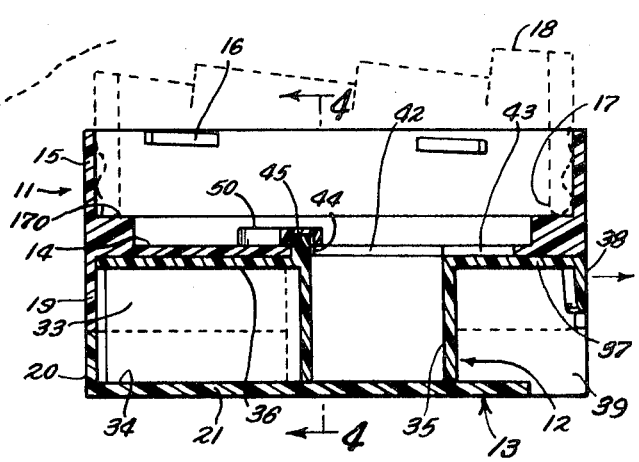
FIG. 3 is an enlarged section taken on line 3—3 of FIG. 2.
Figure 4:
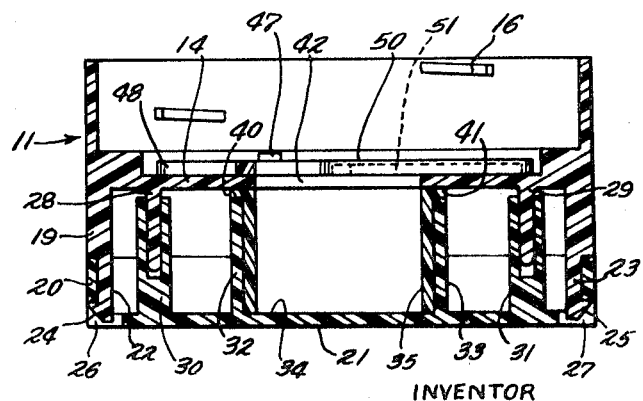
FIG. 4 is a section taken on line 4—4 of FIG. 3.
Figure 5:
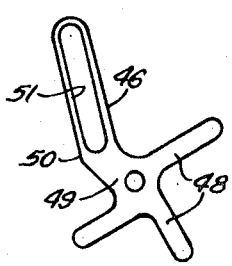
FIG. 5 is a bottom plan view of the agitator for the measuring dispenser shown in FIGS. 1—4 of the drawings.

With reference to FIGS. 3 and 4 it will be noted that the jar engaging upper member 11 has a downwardly projecting circular flange 19 which is in edge-to-edge abutment with an upwardly extending, circular flange 20 formed around the margin of a bottom wall 21 of the slide mounting lower member 13. The upper member has diametrically opposed fingers 22 and 23 (FIG. 4) integral on, and extending downwardly from, the flange 19 and made somewhat resilient by reason of the attenuation of plastic material constituting said fingers. The fingers 22 and 23 have outwardly extending detents 24 and 25, respectively, formed on their lower ends which cooperate with notches 26 and 27, respectively, formed in opposite sides of the flange 20 to detachably secure together the members 11 and 13. Lead-in pins 28 and 29 depend from the supporting wall 14 of the upper member 11 and respectively engage upstanding socketed lugs 30 and 31 formed on the bottom wall 21 of the lower member 13. The lugs slidably receive the pins to guide the members into properly aligned positions during assembly of the dispenser and to securely mount the members against angular displacement in the assembled condition of the members. The members may be taken apart merely by grasping the exposed parts of the fingers 22 and 23, and manually pressing them together which releases the detents 24 and 25 from their respective notches 26 and 27, thus allowing the members to be detached and moved apart.

The lower member 13 is provided with two spaced apart, upstanding planar walls 32 and 33 which form with that portion of the bottom wall 21 between them and the supporting wall 14 of the upper member, a lateral chamber 34 for snugly receiving the dispensing slide 12.

The dispensing slide 12 has a vertical measuring opening 35 formed therethrough which is substantially rectangular in plan, a cutoff plate 36 extending rearwardly from the opening 35, and a forwardly extending plate 37 which terminates in a downwardly depending end portion 38 which provides a handle for the dispensing slide 12. As best shown in FIG. 3 a large aperture 39 is formed in the bottom wall 21 and the flange 20 of the lower member 13 and the flange 19 of the upper member 11 which provides a finger opening for engagement with the handle 38 and also serves as the dispensing mouth for the comminuted material. The dispensing slide 12 has longitudinal edge portions 40 and 41, (FIG. 4) which slide upon the edges of the walls 32 and 33, respectively, to provide additional bearing surfaces for the dispensing slide during operation.

The supporting wall 14 of the upper member 11 has a rectangular discharge opening 42 formed therein substantially forwardly of its center, said opening being provided at its forward end with a longitudinally extending slot 43 and at its rearward end with an aligned notch 44. The slide has an upwardly extending lug 45 formed thereon which extends through the opening 42 and is received in the notches 43 and 44 when the slide is in dispensing and normal positions, respectively.

An agitating spider 46 is pivotally mounted upon the supporting wall 14 of the upper member on a pin 47, fixed on the said wall to one side and rearwardly of the discharge opening 42, and said spider having a number of short arms 48 radiating from a hub 49 thereof and a long arm 50 extending from the hub, the latter arm being provided with a longitudinally extending slot 51 formed in its underside. The lug 45 on the dispensing slide 12 is received in the slot 51 of the long arm 50 and is adapted to move back and forth in the slot during reciprocating movement of the dispensing slide.

Figure 2:
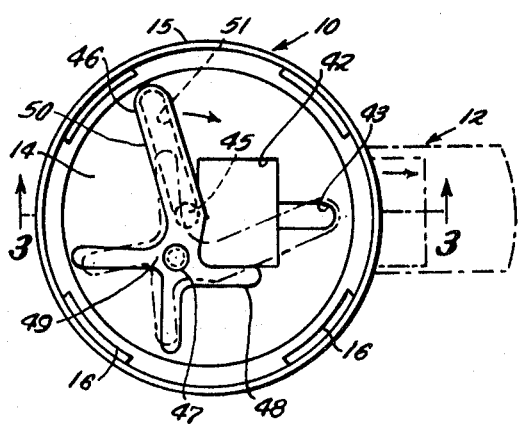
FIG. 2 is a top plan view of the measuring dispenser, the full lines showing the normal position of a material agitator while the dot-and-dash lines illustrate the dispensing position of said agitator.

As best shown in FIG. 2 of the drawings, the full lines therein show the spider 46 and the slide 12 in their normally closed or nondispensing positions with the measuring opening 35 of the slide in vertical alignment with the discharge opening 42 in the supporting wall 14 of the upper member 11. The pin 45 on the dispensing slide is in the inner end portion of the slot 51 of the long spider arm 50 and it will be understood that upon lateral reciprocating movement of the slide 12 from the full line nondispensing portion toward its dispensing position, illustrated in dot-and-dash lines in FIG. 2, the spider will alternately rotate clockwise and counterclockwise around the pivot pin 47. It will be noted that during movement of the spider the long arm and the short arms will each traverse a substantially 90° area of the material supporting wall, thus agitating the packed comminuted material within the jar mouth and upon the supporting wall 14 to positively prevent build up of comminuted material around the discharge opening 42 and thereby insure a full and accurate measure of comminuted material being delivered to the measuring opening 35 of the dispensing slide 12. During oscillation of the spider 46 the long arm 46 sweeps back and forth across the discharge opening 42 to keep said opening clear of granules that might clog the slide.

What I claim is:

1. A measuring dispenser for use with an openmouthed container for comminuted material comprising an upper, container mouth engaging member having a planar material supporting wall, a discharge opening formed centrally in said material supporting wall, a pivot pin projecting upwardly at right angles from said wall and disposed on one side of the discharge opening therein, a dispensing slide having a measuring opening formed therethrough, a lower member having a discharge opening formed therein that is laterally offset with respect to the discharge opening in the upper member, means connecting the lower member to the upper member, guide means formed between the members and adapted to mount the dispensing slide for laterally directed, reciprocating motion between limits alternately aligning the measuring opening with each discharge opening in the upper and lower members, a flat material agitating spider positioned and supported for oscillating movement upon the material supporting wall, said spider having a hub pivotally mounted on the pin and a number of arms radiating from the hub, and at least one of said arms having movement over and from one side to the other of said opening, and a drive connection between said one arm of the spider and the dispensing slide whereby said arm of the spider sweeps back and forth across the discharge opening in the material supporting wall with each reciprocation of the dispensing slide.

2. A measuring dispenser set forth in claim 1 wherein the one said arm is elongated and has a downwardly opening slot therein, and the drive connection between the spider and the dispensing slide is an upstanding lug fixed on the slide and extended through the discharge opening in the material supporting wall and slidably engaged in the said slot.

3. A measuring device as set forth in claim 2 wherein the elongated arm and the other arms of the spider are substantially at right angles to each other and each arm sweeps across substantially a quarter of the area of the supporting wall during pivotal movement thereof.

4. A measuring dispenser set forth in claim 1 wherein the means connecting the lower member to the upper member comprises a pair of opposed spring fingers each having a detent formed on its lower end, said detents each detachably engaging a notch formed in the lower member.